(12) United States Patent
Ebner et al.

(10) Patent No.: US 8,405,640 B2
(45) Date of Patent: Mar. 26, 2013

(54) CONTROL SURFACE FOR A DATA PROCESSING SYSTEM

(75) Inventors: Richard Ebner, Wels (AT); Robert Koeppe, Linz (AT)

(73) Assignee: Isiqiri Interface Technologies GmbH (AT)

( * ) Notice: Subject to any disclaimer, the term of this patent is extended or adjusted under 35 U.S.C. 154(b) by 203 days.

(21) Appl. No.: 13/054,206

(22) PCT Filed: Jun. 30, 2009

(86) PCT No.: PCT/AT2009/000258
§ 371 (c)(1),
(2), (4) Date: Jan. 14, 2011

(87) PCT Pub. No.: WO2010/006348
PCT Pub. Date: Jan. 21, 2010

(65) Prior Publication Data
US 2011/0115750 A1  May 19, 2011

(30) Foreign Application Priority Data

Jul. 15, 2008 (AT) ............................. A 1094/2008
Jan. 7, 2009 (AT) ................................. A 18/2009

(51) Int. Cl.
*G06F 3/042* (2006.01)
(52) U.S. Cl. .................. 345/175; 345/173; 345/176
(58) Field of Classification Search .................. 345/158, 345/173, 175, 176, 179, 183, 207, 208; 178/18.09, 178/18.11, 19.04, 19.05; 434/19, 21
See application file for complete search history.

(56) References Cited

U.S. PATENT DOCUMENTS

| | | | | |
|---|---|---|---|---|
| 4,484,179 A * | 11/1984 | Kasday | | 345/176 |
| 5,005,979 A | 4/1991 | Sontag et al. | | |
| 5,788,500 A * | 8/1998 | Gerber | | 434/22 |
| 5,816,817 A * | 10/1998 | Tsang et al. | | 434/22 |
| 6,469,785 B1 * | 10/2002 | Duveneck et al. | | 356/244 |
| 7,062,134 B2 * | 6/2006 | Veligdan et al. | | 385/120 |
| 7,351,949 B2 * | 4/2008 | Oon et al. | | 250/221 |
| 8,120,595 B2 * | 2/2012 | Kukulj et al. | | 345/176 |
| 8,184,101 B2 * | 5/2012 | Keam et al. | | 345/173 |

(Continued)

FOREIGN PATENT DOCUMENTS

| | | |
|---|---|---|
| DE | 3413372 A1 | 10/1985 |
| DE | 3544290 A1 | 6/1987 |

(Continued)

OTHER PUBLICATIONS

International Search Report for PCT/AT2009/000258, Completed by the European Patent Office Oct. 29, 2009, 6 Pages.

*Primary Examiner* — Joe H Cheng
(74) *Attorney, Agent, or Firm* — Brooks Kushman P.C.

(57) ABSTRACT

The invention relates to an optical-signal based control surface for a data processing system, the surface being designed as a planar optical fiber, on which photoelectric sensors are provided, the measured signals of which are used to deduce the position of a light signal striking the control surface and the position being associated with a processing mark in the data processing system. A layer having photoluminescent properties is in contact with at least one layer of the planar optical fiber. The light of the light beam shining on the control surface is converted into longer-wave light by way of photoluminescence, the light being coupled into the waveguide, diffusing therein, and being measured by the photoelectric sensors.

17 Claims, 5 Drawing Sheets

U.S. PATENT DOCUMENTS

| | | | |
|---|---|---|---|
| 8,269,746 B2 * | 9/2012 | Hodges et al. | 345/175 |
| 8,358,892 B2 * | 1/2013 | Oda et al. | 358/47 |
| 2002/0097230 A1 * | 7/2002 | Lowry et al. | 345/175 |
| 2005/0243070 A1 * | 11/2005 | Ung et al. | 345/176 |
| 2006/0002655 A1 * | 1/2006 | Smits | 385/31 |
| 2006/0227120 A1 * | 10/2006 | Eikman | 345/175 |
| 2006/0290684 A1 * | 12/2006 | Giraldo et al. | 345/175 |
| 2007/0052684 A1 * | 3/2007 | Gruhlke et al. | 345/173 |
| 2007/0152985 A1 * | 7/2007 | Ostergaard et al. | 345/176 |
| 2007/0176165 A1 | 8/2007 | Forrest et al. | |
| 2008/0088603 A1 * | 4/2008 | Eliasson et al. | 345/176 |
| 2008/0179507 A2 * | 7/2008 | Han | 250/224 |
| 2008/0252619 A1 * | 10/2008 | Crockett et al. | 345/175 |
| 2010/0079493 A1 * | 4/2010 | Tse et al. | 345/650 |

FOREIGN PATENT DOCUMENTS

| | | |
|---|---|---|
| DE | 4239389 A1 | 5/1994 |
| EP | 0225625 A2 | 6/1987 |
| EP | 0354996 A2 | 2/1990 |

* cited by examiner

CONTROL SURFACE FOR A DATA PROCESSING SYSTEM

The invention relates to a control panel, based on optical signals, for a data processing installation and to a method for operating such a control panel.

In one aspect thereof, the present invention relates to the use of the control panel as a detector panel which may be arranged as a flexible envelope around or on a body in order to detect whether and where the body is hit by a luminous point.

US 2007/0176165 A1 shows a design for a position detector for an impinging point of light, said position detector being of two-dimensional design and based on light-sensitive organic semiconductors. The detector of two-dimensional design forms a single large-area sensor cell. It comprises a plurality of layers, at least one layer of which is photoactive. At its edge, the position detector is provided with connection electrodes which are at a distance from one another and which can be used to remove an electrical signal from which the location of the occurrence of a beam of light is inferred. In comparison with a design having many individual light-sensitive cells arranged next to one another, the arrangement is less expensive and of simpler design, but it provides less resolution.

US 2007 0152985 A1 presents an optical touchpad in the form of a two-dimensional optical waveguide. An article which is in contact with the waveguide of the touchpad launches light from an external source into the waveguide of the touchpad by means of scattering at the surface of the article. The detection of the location of the launch is made possible by means of a photoelectric detector—which is not described in more detail.

The documents DE 42 39 389 A1, EP 354 996 A2 and EP 225 625 A2 describe optical position measuring devices in which fluorescent molecules are arranged on or in an optical waveguiding panel, which molecules convert externally impinging light into longer-wavelength, diffusely scattered light which is routed in the optical waveguiding panel to the panel edges thereof and has its intensity captured by sensors either at that location or not until at a different location, to which it is routed via optical waveguides. Since the intensity of the measured light decreases with a distance from the point of impingement of the beam of light, combination of the measurement results from a plurality of sensors allows the point of impingement of the beam of light to be inferred. In comparison with the method described previously, in which the impinging light is routed to the sensors without conversion in the waveguide, it is advantageous that the signal is less dependent on the angle at which the beam of light hits the panel. The use of this principle for an input appliance in a data processing installation is not considered in these documents. In addition, the position resolution is inadequate for this purpose in the case of larger panels, since in the present documents the detectors are usually fitted at the edge of the waveguide.

The currently most important application for the use of the control panel as an optical detector panel which is arranged as a flexible envelope around or on a body is the detection of hits in combat simulations or combat games in which, instead of firearm simulation devices which fire something material such as a dye or a soft foam rubber ball, luminous devices are used which emit a focused pulse of light.

Besides the relatively well known combat game "Paintball", in which devices similar to firearms are used to shoot harmless, easily washable paint blots instead of projectiles, there are increasingly also combat games in which devices which otherwise resemble guns in terms of appearance and handling, are used to emit short pulses of laser light. The persons taking part, who can of course also be hit in the course of the game, wear clothing on which photodiodes used as photoelectric sensors are fitted in a grid with spacing of several centimeters, said photodiodes detecting the impingement of an aforementioned laser pulse. The position of the individual photodiodes on an individual is recorded in a data processing installation. If a laser pulse hits a photodiode, this triggers a signal and sends it to the data processing installation, as a result of which the latter records the individual wearing the relevant photodiode at a particular point on his body as having been hit at said point on his body.

It is found to be disadvantageous that it has not been possible to date, for reasons of cost and handling, to equip the participants with photoelectric sensors comprehensively, but rather this being possible only using a relatively coarse grid. So that a hit is reliably detected, the dimensions of the cross-sectional area of the beam of light emitted by a laser needs to be at least as large as the grid spacing between the individual photodiodes. This results in design problems for the configuration of the laser. Furthermore, precise evaluation of the hit location is possible only with a very dense arrangement of the sensors, which makes the costs for the clothing excessively high. If the sensors are in a loose arrangement, the beam of light needs to be severely enlarged, which means that sometimes a hit is indicated even though a point just next to the target person was hit.

The object on which the invention is based is that of providing a design for a control apparatus for a data processing installation, wherein a beam of light is sent to a control panel and the point of impingement of the beam of light on the control panel is taken as a basis for influencing the data processing installation, for example by virtue of the point of impingement being assigned a cursor position in a menu or on a virtual typesheet or character sheet. In comparison with previously known control apparatuses in which this principle is implemented, the control apparatus to be created also needs to be able to be used for relatively large control panels, for example projection screens, and in so doing nevertheless be able to have very good absolute position resolution, while being of simple and inexpensive design.

In one important aspect, the object on which the invention is based is that of providing a control panel which acts as a detector panel and which may be arranged as a flexible envelope around a body, and which can detect in a manner which can be used by a data processing installation whether and where on a body a point of light impinges. In contrast to the previously known arrangement of "isolated" photoelectric sensor elements arranged at a distance from one another in a grid, the detector panel to be provided needs to be at least approximately completely photosensitive while being of simple and inexpensive design.

The object is achieved by providing for the control panel to be in the form of a two-dimensional optical waveguide which incorporates photoluminescent particles and one side of which has a plurality of small-area photoelectric sensors which are in a distributed arrangement over the panel and which are able to decouple and detect light from the waveguide mode, with the result that the intensity of the light decoupled at the respective location is taken as a basis for generating an electrical signal.

The photoluminescent particles, for example dye molecules or semiconductor nanoparticles, convert externally impinging light into scattered light at a longer wavelength. This light is for the most part launched into the waveguide and propagates therein. Since the light propagates in the waveguide and also the light guidance in the waveguide is subject to losses, the light intensity in the waveguide decreases at distance from the source of emission of the light, that is to say the point at which the luminescence takes place, and hence the electrical signal produced on the respective sensors also decreases. If a plurality of sensors are arranged at a distance from one another on an optical waveguide, the ratio of the measured signal strengths on the individual sensors can be taken as a basis for using mathematical methods—that can be automated in terms of data—to infer the position of impingement of the beam of light that triggers the luminescence on the control panel.

The control panel according to the invention can be implemented by distinguishing between two basic types—which can be combined with one another, however:

According to the first principle, the entire control panel may be formed by a multiplicity of individual smaller two-dimensional optical waveguides which adjoin one another geometrically but are isolated from one another in terms of wave guidance. Each optical waveguide is provided with precisely one photoelectric sensor. The latter merely establishes whether or not the respective optical waveguide has been hit by a beam of light. It does not need to and cannot provide any information about what panel element of the optical waveguide has been hit by precisely the relevant control panel element.

According to the second principle, the entire detector panel may be in the form of a single continuous optical waveguide. This optical waveguide has a multiplicity of small-area photoelectric sensors at a grid spacing from one another. Depending on how close individual sensors are to the respective launch point for light into the waveguide, the measured signal from said sensors has different strengths. This means that the amplitude of signals from a plurality of sensors, the position of which on the waveguide is known, can be used to deduce the launch point.

The first principle is more robust and results in simpler evaluation electronics and simpler data processing. According to the second principle, a finer resolution can be achieved without an increase in cost.

The combination of the two principles involves the entire control panel being divided into a plurality of two-dimensional optical waveguides, at least some of which optical waveguides are equipped with more than one sensor for the purpose of finer resolution. This can be used to achieve greater mechanical resilience and simpler malleability, for example.

Since, by way of example, the selection of the photoluminescent particles makes it possible to set that only a particular, narrow spectrum of incident light actually triggers luminescence, and by virtue of the use of a luminous pointer which is highly luminous precisely in this spectral range, the apparatus can be made very insensitive toward ambient light. By tapping off the light which is guided in the optical waveguide on one of the two large surface sides of the control panel and not imperatively in the region of an end face of the control panel, the apparatus can have a very good absolute position resolution even with a very large-area design, for example as a projection screen, if it is occupied only by a correspondingly narrow grid of measurement points.

The control panel according to the invention is illustrated in three views:

FIG. 1 uses symbols to show the essential elements of the second principle in connection with a control panel according to the invention. The control panel itself is shown not to scale in a cross-sectional view; beams of light are symbolized by dotted lines.

Figure 1:
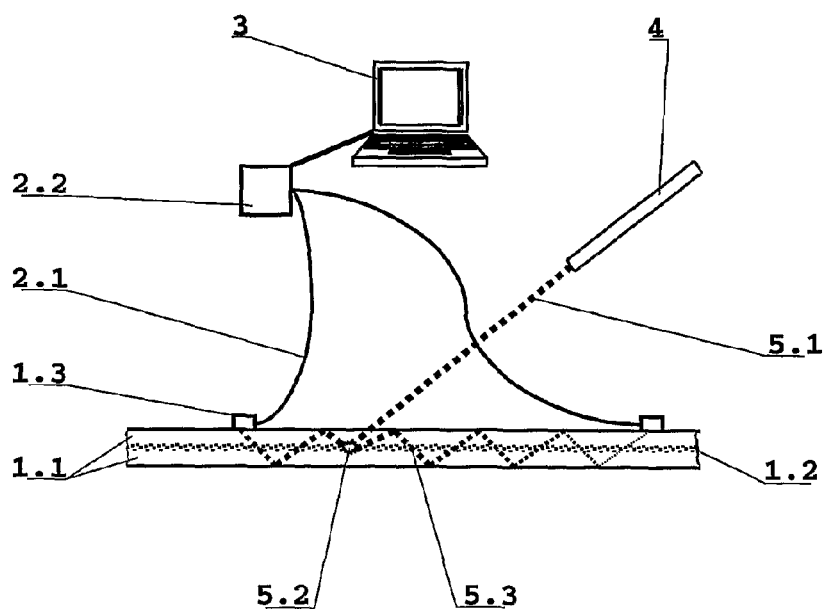

The photoluminescent particles in layer 1.2, for example dye molecules or semiconductor nanoparticles, convert externally impinging light into scattered light at a longer wavelength. This light is for the most part launched into the waveguide and propagates therein.

Since the light propagates in the waveguide and also the light guidance in the waveguide is subject to losses, the light intensity in the waveguide decreases at distance from the source of emission of the light, that is to say the point at which the luminescence takes place, and hence the electrical signal produced on the respective sensor also decreases. If a plurality of photoelectric sensors are connected to a two-dimensional optical waveguide, the ratio of the measured signal strengths on the individual sensors can be taken as a basis for using mathematical methods—that can be automated in terms of data—to infer the more precise position of impingement of the beam of light that triggers the luminescence on the detector panel.

Since, by way of example, the selection of the photoluminescent particles makes it possible to set that only a particular, narrow spectrum of incident light actually triggers luminescence, and by virtue of the use of a luminous pointer which is highly luminous precisely in this spectral range, the apparatus can be made very insensitive toward ambient light. By tapping off the light which is guided in the optical waveguide on one of the two large surface sides of the detector panel and not imperatively in the region of an end face of the detector panel, the apparatus can have a very good absolute position resolution even with a very large-area design, if it is occupied only by a correspondingly narrow grid of measurement points.

In the outlined example, the detector panel comprises, for example, two top layers 1.1 of PET which are approximately 0.1 mm thick and between which a layer 1.2—approximately 0.001 mm thick—of a homogeneous mixture of the plastic polyvinyl alcohol and the dye Rhodamin 6G is laminated. The PET layers 1.1 with the interposed layer 1.2 form the optical waveguide. The layer 1.2 is photoluminescent. It is of such strength that its absorption for normally impinging light at a wavelength of 532 nm is above 80%. (The layer thickness required for this is best ascertained by experiment). In a square grid having a period length of 5 cm, silicon photodiodes 1.3 which have a cross-sectional area of approximately $2 \times 2$ mm$^2$ are fitted on the exposed side of one of the two PET layers 1.2 such that they decouple light from the PET layer and launch it at the pn junction thereof. The signals from all the photodiodes 1.3 are supplied via photoelectric lines 2.1 and a frequency filter 2.2 to a data processing installation 3, in which they are measured and processed.

When a spot of light with a suitable spectrum hits the layer 1.2, it triggers luminescence in the integrated particles. The resultant longer-wavelength light is for the most part launched into the waveguide formed by the layers 1.1 and 1.2. The light in the waveguide mode becomes less intense as a result of the distribution and attenuation in the waveguide. Hence, the photoelectric sensors 1.3 measure a different intensity for the light in the waveguide mode, depending on how far the point of impingement of the light which produces the luminescence is from the electric sensor. By comparing the signals on the various sensors, it is possible to infer the position of the point of impingement.

Intended signals are obtained because a laser 4, which may be part of a firearm simulation device or a laser pointer, for example, is used to send a frequency-modulated, green laser beam 5.1 at a wavelength of 532 nm to the control panel. This produces a spot of light 5.2 on the control panel, said spot of light prompting the dye to luminesce. The emitted light 5.3 of relatively great wavelength is partially launched into the waveguide formed by the layers 1.1 and 1.2, propagates therein and in so doing loses intensity as the distance from the spot of light 5.2 increases. The distance between the point of impingement of the laser beam 5.1 and the respective photodiode will render the signal from the respective photodiode smaller. This is used to determine the distance of the point of impingement relative to a plurality of photodiodes.

Depending on area and required resolution, an arbitrary number of sensors, preferably in a regular pattern, can be mounted on the control panel. The mounting can be effected using an adhesive which cures transparently for the emission of the dye and which produces good optical contact between waveguide and sensor. The more densely the sensors are mounted, the larger the signal and accordingly the resolution of the component given the same reading electronics. In experiments with an optimized waveguide on the basis of a plastic plate doped with dyes, it was possible to obtain an accuracy of better than +/−1 mm at a distance of 12 cm between the sensors in a square pattern.

By way of example, a control panel according to the invention may be implemented as a layer on a projection screen which is used as a display panel for a computer. If the laser pointer 4 is used to point to said display panel, the coordinates of that point which the beam of light 5.1 from the laser pointer 4 hits on the display panel are recognized by the data processing installation in the manner described. To these coordinates, it is possible for the operating system running on the data processing installation to assign the position of a cursor, that is to say of an insertion marker, type marker or input marker which is otherwise usually moved by means of a "mouse", on the display panel.

The control panel described can also be produced inexpensively in a large-area version. For example if it is intended to be arranged in front of display panels, it may be wholly constructed from largely transparent materials. This requires dyes which absorb only at the edges or outside of the visible light spectrum.

If the control panel itself is intended to serve as a projection panel, its outward visible form may be white or silver, for example by means of a semitransparent top layer. Generally, it is of mechanically flexible design so that it can be fitted virtually to all popular display panels. In the case of transparent display panels, it can also be fitted behind display panels.

A detector panel according to the invention may be fitted as a flexible layer on a piece of clothing for an individual. If the laser 4 is used to send a pulse of light to said detector panel, the coordinates of that point which is hit by the pulse of light 5.1 from the laser 4 on the display panel are recognized by the data processing installation in the manner described.

The problem that ambient light must not be erroneously detected as a point of impingement of the luminous pointer in order to identify a hit can be taken into account very easily. Firstly, the spectral range of the light which triggers luminescence can be kept very closely around that spectral line on which the laser 4 is working. Secondly, the laser can emit frequency-modulated light. That is to say that the intensity of the laser beam 5.1 fluctuates over time at a particular frequency. This frequency is filtered out of the signals delivered by the photodiodes 1.3 using communication means. As a result of the use of differently frequency-encoded laser beams, it is possible to use frequency filters in order to distinguish between a plurality of simultaneously impinging laser beams and to recognize the respective impingement positions thereof on the control panels.

Ambient light can also be filtered out by a layer which is fitted on the control panel and which allows the passage of only light in a particular spectral range.

In one advantageous further development, the photoelectric sensors present on the detector panel can be used to produce electric power which is used for the reading electronics and wireless data transmission, for example.

Figure 2:
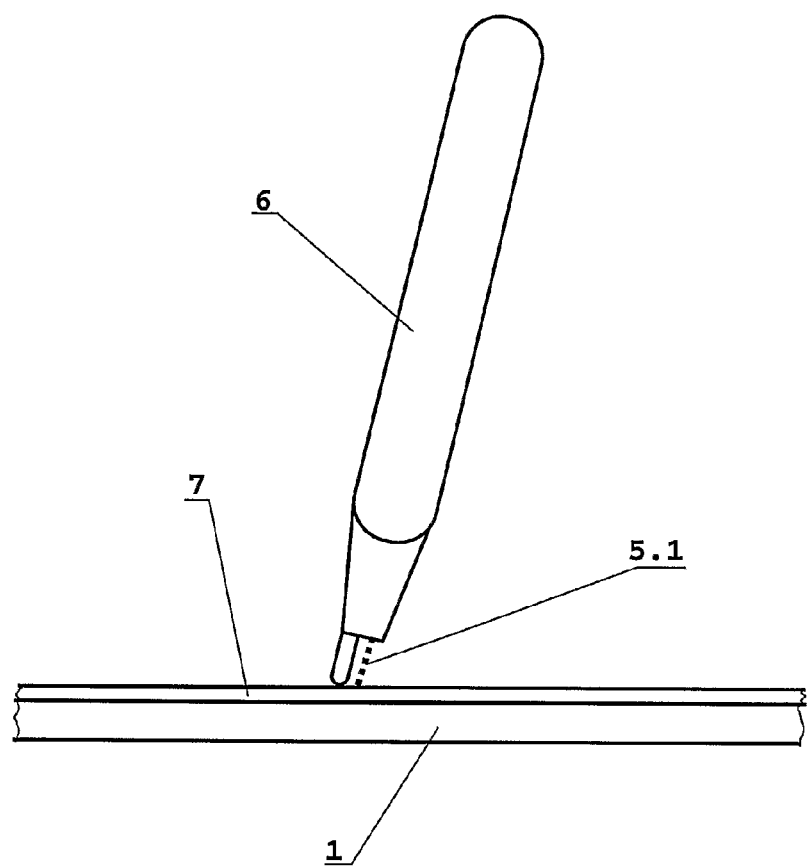
FIG. 2 illustrates an advantageous mode of application of a control panel according to the invention.

In the application example shown in FIG. 2, a control panel 1 according to the invention is fitted with a writable layer 7, for example a sheet of paper or a wipeable film, and a pen 6 is used to write or draw on the latter by hand. Not only does the pen 6 dispense dye at its tip, it also sends a beam of light 5.1 (e.g. by means of a light-emitting diode coupled to an optical fiber) to the vicinity of that point on the writable layer 7 with which the pen is in contact at its dye-dispensing tip. Even if the writable layer 7 is an apparently nontransparent piece of paper, the penetrating portion of the light is entirely adequate to generate signals in the underlying control panel 1 in the manner described above, which signals allow the position of said light on the control panel to be detected. This makes it a simple matter both to write or draw on paper or film by hand and to store the result simultaneously as an image file in the data processing installation for the purpose of further use and/or processing. By just using a luminous pen to trace along lines of a drawing placed on the control panel, existing drawings can be selectively reproduced in an image file very well.

In addition, it should also be stressed that the beam of light 5.1 does not necessarily have to be a laser beam. It is merely the case that if the beam of light 5.1 is a laser beam, particularly advantageous circumstances arise, since the beam of light can therefore have its properties determined very exactly and detection is a simple matter even at very large distances from the light source.

Figure 3:
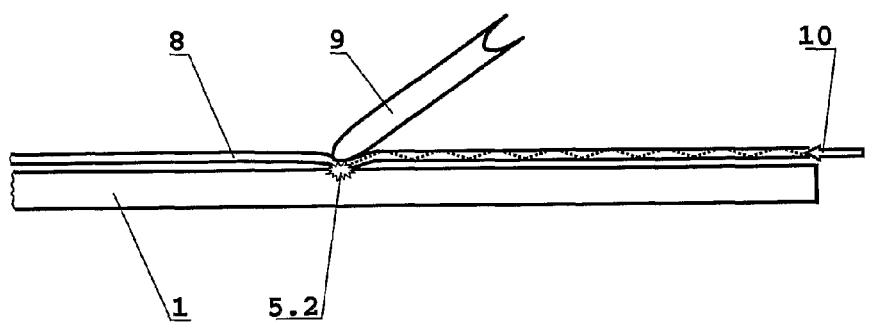
FIG. 3 illustrates an advantageous further development of a control panel according to the invention, including the application as a touchpad which is possible as a result.
Figure 4:
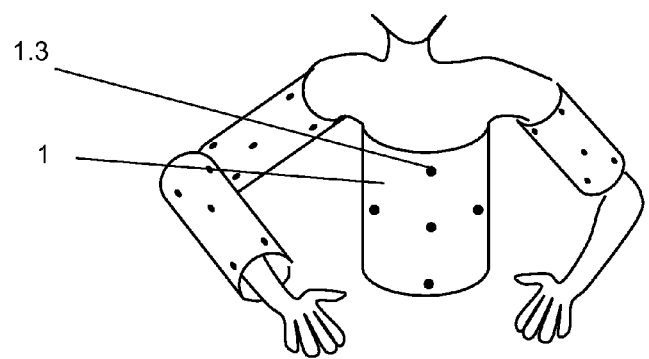
FIG. 4 shows the waveguide in the form of a flexible envelop around a body of an individual, and as part of the clothing of the individual.
Figure 5:
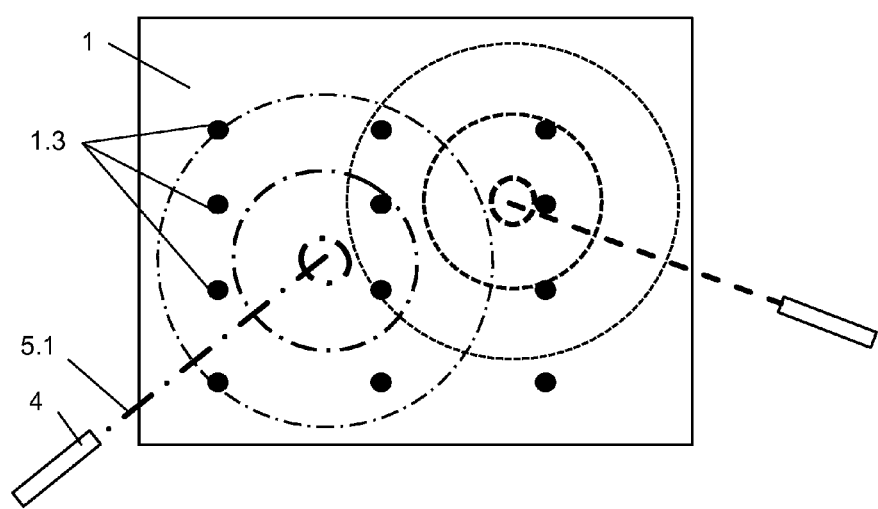
FIG. 5 shows an optical waveguide provided with a plurality of photoelectric sensors which are arranged at a distance from one other, and a plurality of laser beams.
Figure 6:
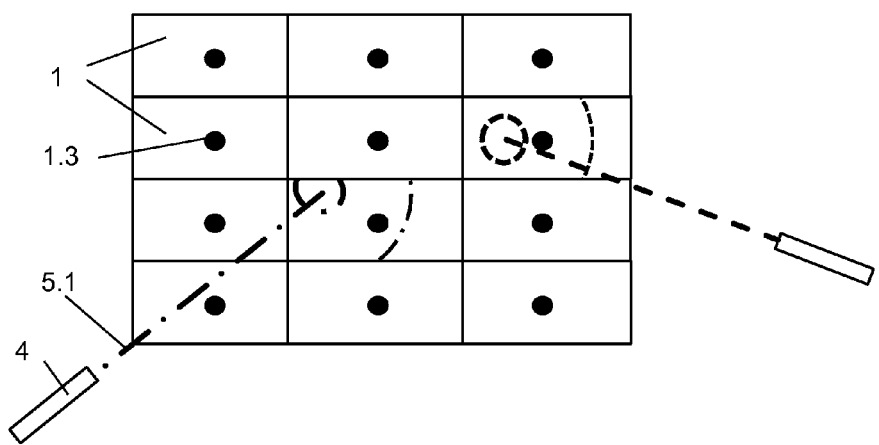
FIG. 6 shows a plurality of geometrically adjacent panel elements comprising optical waveguides which are isolated from one another with respect to wave guidance.
Figure 7:
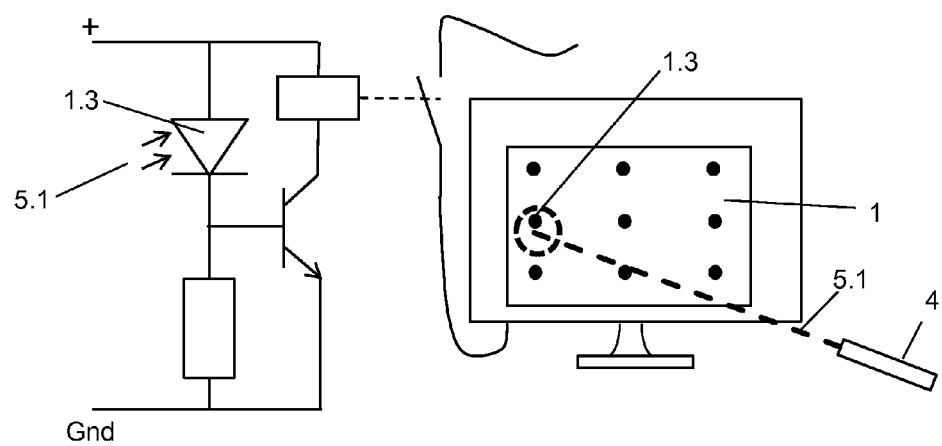
FIG. 7 shows a switch for an appliance which can be operated remotely by means of a luminous pointer, and the appliance being switched around or on which the control panel is arranged.

A very advantageous additional use—outlined in FIG. 3—for a control panel 1 according to the invention as a touchpad can be achieved by virtue of a further two-dimensional waveguide 8, into which light 10 is launched, preferably from an end face, being arranged parallel to the control panel 1 according to the invention, at as short a distance as possible therefrom. The waveguide 8 does not need to have any luminescence properties. If a mechanical load, for example the pressure of a finger or of a stylus 9, presses the waveguide 8 and the control panel 1 against one another then, at the location of the touch between the two panels, light from the waveguide 8 is launched into the control panel 1 and, as already described further above, produces luminescence therein and allows position determination. This results in a very accurate method of position determination. Frequency modulation of the light fed into the waveguide 8 allows the arrangement to be designed to be extremely insensitive toward background light. Otherwise, the design shown in FIG. 3 may nevertheless be additionally controllable by a luminous pointer, and both signals may be explicitly distinguishable by virtue of different frequency modulation of the light sources.

The use for simulating firearms is best combined with the connection of the sensor panels to a mobile telecommunication appliance which undertakes the hit evaluation and indicates a hit by means of audible and/or visual signals. Furthermore, the telecommunication appliance is able to receive a wireless electronic connection for a data processing appliance in order to reproduce an evaluation of what is happening on a screen or via the Internet.

A further advantageous application is for the detector panels to be mounted on surfaces in and on buildings in order to use them as switches for various devices such as lighting, shading devices, automatic gates and doors or electronic appliances, for example. These can be activated remotely using a luminous pointer. The advantage is that a single luminous pointer can be used as a multipurpose remote control for a large number of applications. Which application is switched in which way is the result of the arrangement of the sensor panels.

The invention claimed is:

1. A control panel for receiving a spot of light from which a data processing installation generates a spot of light position, the control panel comprising:
   a two-dimensional optical waveguide layer;
   a photoluminescent layer within or disposed on a surface of the optical waveguide layer; and
   a plurality of photoelectric sensors fitted on the optical waveguide layer at spaced apart locations;
   wherein when a spot of light with a suitable spectrum impinges on the control panel a two-dimensional diffusion of luminescence occurs in the photoluminescent layer, and wherein measured signals from the sensors are used to infer a position of a point of the light.

2. The control panel as claimed in claim 1, wherein the photoelectric sensors are fitted on surface regions of an outer layer adjacent to the photoluminescent layer acting as a waveguide and are situated remotely from edges of the outer layer, so that light from the waveguide is decoupled into the photoelectric sensors.

3. The control panel as claimed in claim 1, wherein the beam of light impinging on the control panel has its intensity frequency-modulated and in that the photoelectric sensors have a frequency filter connected downstream of them, the passband of which is set for the modulation frequency of the intensity of the beam of light.

4. The control panel as claimed in claim 1, wherein the waveguide layer comprises a transparent material.

5. The control panel as claimed in claim 1, wherein the signals from the photoelectric sensors are produced in response to pressure applied directly on the surface of the waveguide layer.

6. The control panel as claimed in claim 1, wherein another two-dimensional waveguide layer extends parallel to the two-dimensional waveguide layer which can be brought into contact therewith by means of pressure and into which it is possible to launch light from the outside.

7. The control panel as claimed in claim 1, wherein the control panel is arranged as a flexible envelope around or on a body in order to detect where the body is hit by a luminous pointer.

8. The control panel as claimed in claim 7, wherein the control panel is constructed from a plurality of geometrically adjacent panel elements having optical waveguides which are isolated from one another in respect of wave guidance and wherein each optical waveguide is provided with at least one photoelectric sensor.

9. The control panel as claimed in claim 7, wherein the control panel is constructed from a plurality of geometrically adjacent panel elements comprising optical waveguides which are isolated from one another in respect of wave guidance, wherein at least one optical waveguide is provided with a plurality of photoelectric sensors which are arranged at a distance from one another and wherein the amplitude conditions of the signals relative to one another, which are generated by the different photoelectric sensors upon an event, can be evaluated.

10. The control panel as claimed in claim 7, wherein the control panel is part of the clothing of an individual.

11. The control panel as claimed in claim 1, wherein the control panel is used as a switch for an appliance which can be operated remotely by means of a luminous pointer.

12. The control panel as claimed in claim 11, wherein the control panel is arranged on a body of the appliance.

13. A method for operating a control panel based on optical signals for a data processing installation, the method comprising:
   fitting a plurality of photoelectric sensors on a two-dimensional optical waveguide;
   converting a point of light impinging on the control panel on a layer of the two-dimensional optical waveguide by photoluminescence into longer-wavelength light which propagates in the two-dimensional optical waveguide and attenuates as the distance from the point of light increases;
   decoupling the longer-wavelength light from the optical waveguide via the photoelectric sensors; and
   inferring a position of the point of light from the signal produced on the photoelectric sensors on the control panel using automated computation methods.

14. The method as claimed in claim 13, wherein the point of light is caused by a laser beam, the intensity of which is frequency-modulated, and in that signals at the modulation frequency of the laser beam are selected from the output signals from the photoelectric sensors by means of filtering.

15. The method as claimed in claim 14, wherein a plurality of laser beams are used which are modulated at different frequencies and in that the output signals from the photoelectric sensors are filtered on the basis of these individual frequencies.

16. The method as claimed in claim 13, wherein a writable layer is applied to the control panel and said layer is written on using a pen which sends a beam of light to the vicinity of that point on the layer with which a tip thereof is in contact.

17. The method as claimed in claim 13, wherein light from another two-dimensional waveguide, into which light has been launched, is launched into the control panel by virtue of the waveguide being brought into contact with the control panel by pressure loading.

* * * * *